No. 724,552. PATENTED APR. 7, 1903.
F. H. DANIELS & S. T. & C. H. WELLMAN.
INGOT HEATING FURNACE.
APPLICATION FILED JUNE 19, 1902.
NO MODEL. 5 SHEETS—SHEET 3.

No. 724,552. PATENTED APR. 7, 1903.
F. H. DANIELS & S. T. & C. H. WELLMAN.
INGOT HEATING FURNACE.
APPLICATION FILED JUNE 19, 1902.
NO MODEL. 5 SHEETS—SHEET 4.
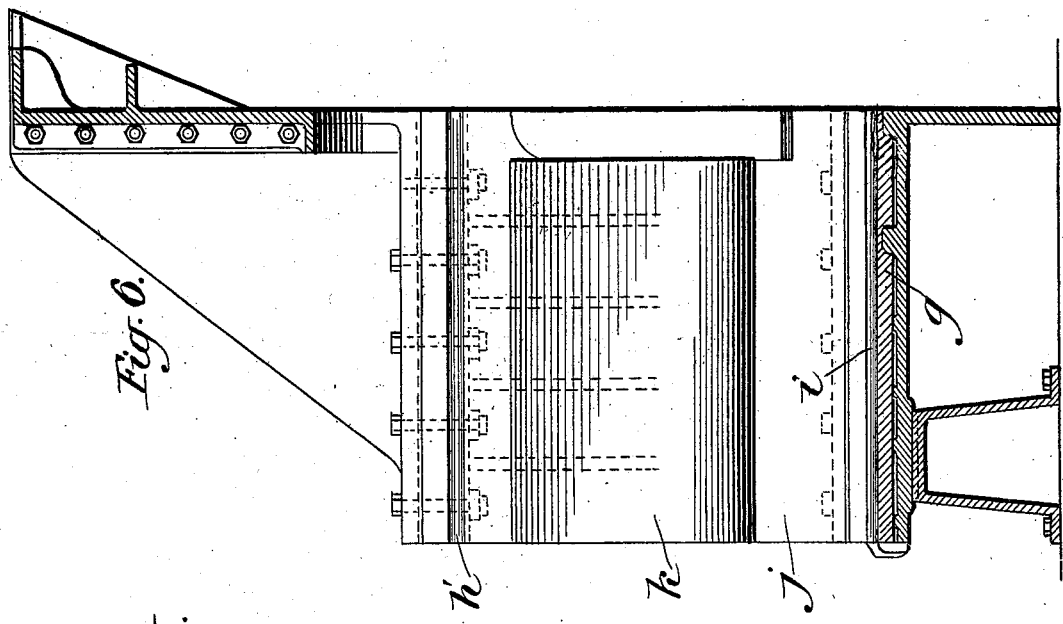
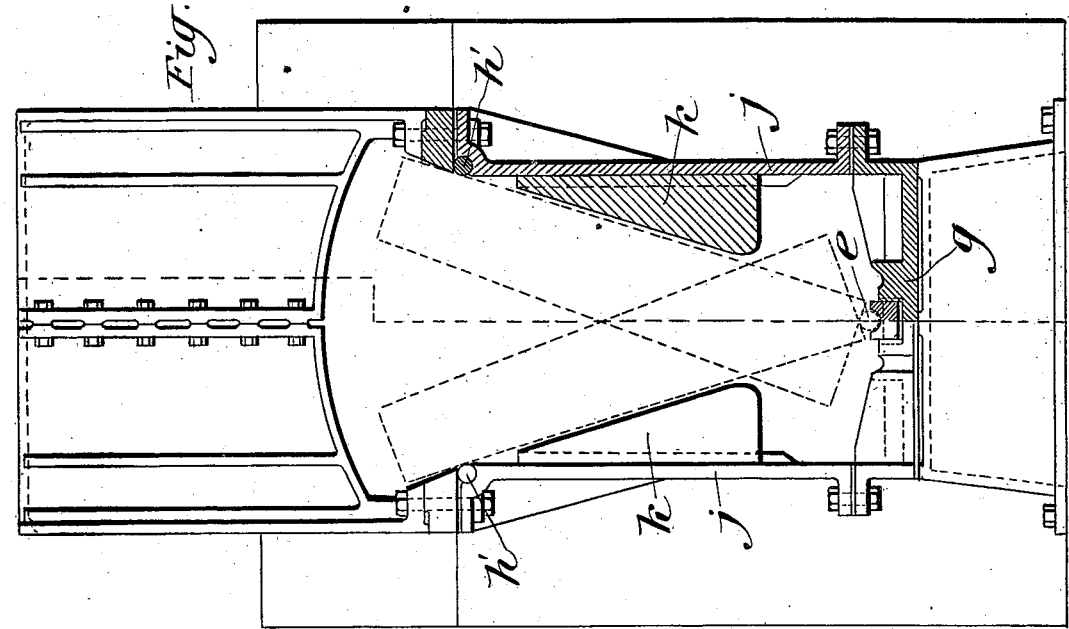
Witnesses:
D. W. Edelin.
Chas. J. O'Neill
Inventors
F. H. Daniels,
S. T. Wellman, &
C. H. Wellman by
Pennie & Goldsborough

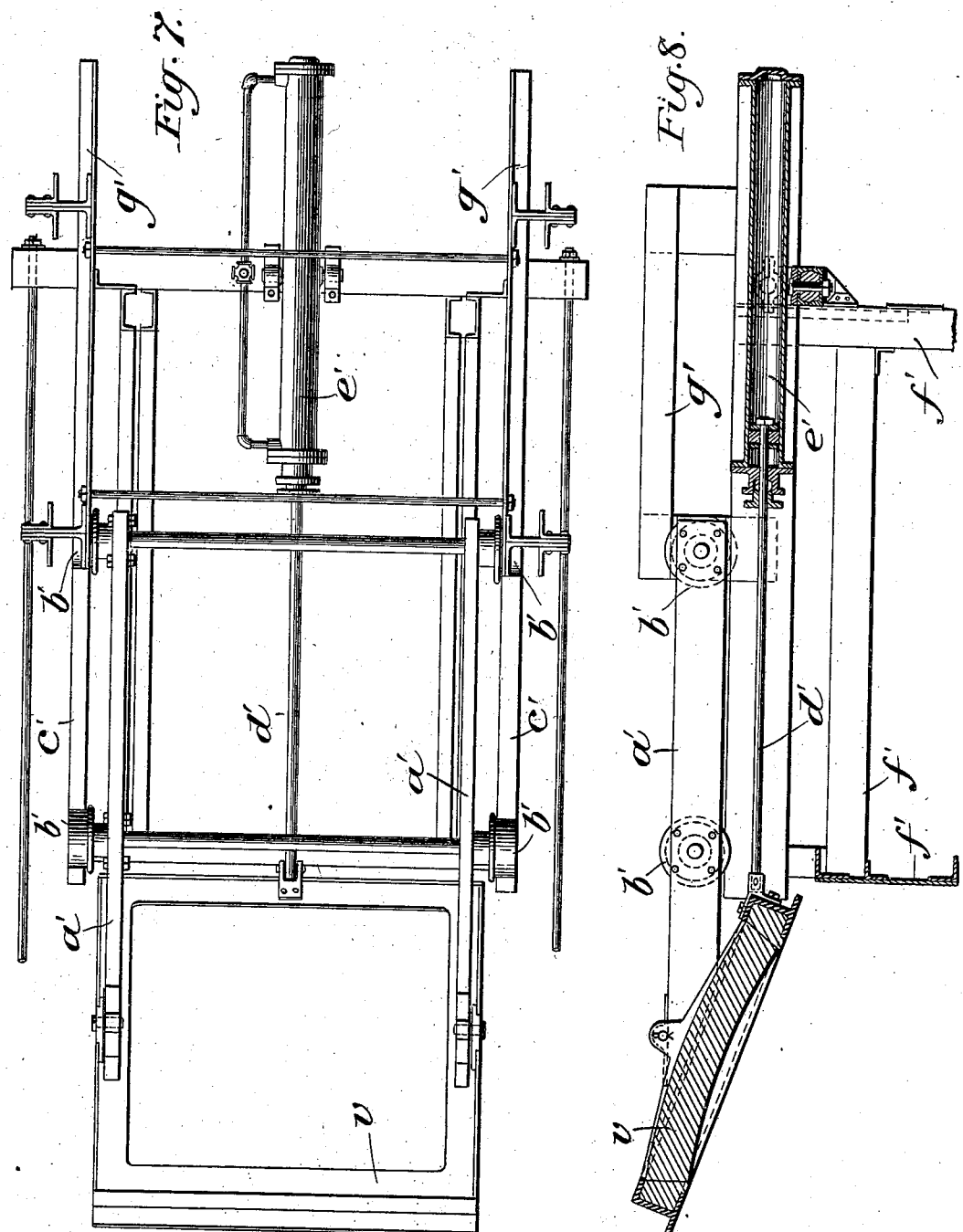

UNITED STATES PATENT OFFICE.

FRED H. DANIELS, OF WORCESTER, MASSACHUSETTS, AND SAMUEL T. WELLMAN AND CHARLES H. WELLMAN, OF CLEVELAND, OHIO; SAID WELLMAN AND WELLMAN ASSIGNORS TO THE WELLMAN-SEAVER-MORGAN ENGINEERING COMPANY, OF CLEVELAND, OHIO, A CORPORATION OF OHIO.

INGOT-HEATING FURNACE.

SPECIFICATION forming part of Letters Patent No. 724,552, dated April 7, 1903.

Application filed June 19, 1902. Serial No. 112,322. (No model.)

*To all whom it may concern:*

Be it known that we, FRED H. DANIELS, residing at Worcester, county of Worcester, State of Massachusetts, and SAMUEL T. WELLMAN and CHARLES H. WELLMAN, residing at Cleveland, county of Cuyahoga, State of Ohio, all citizens of the United States, have invented certain new and useful Improvements in Ingot Heating Furnaces; and we do hereby declare the following to be a full, clear, and exact description of the invention, such as will enable others skilled in the art to which it appertains to make and use the same.

The invention relates to the type of furnace illustrated, described, and claimed in our Patent No. 645,305, dated March 13, 1900, and has to do more especially with improvements in the manner of getting the ingots into and out of the furnace. Certain details of the construction of the interior of the furnace-chamber and the construction and manner of operating the door at the discharge end are also included herein.

The improvements are illustrated in the accompanying drawings, wherein—

Figure 1:
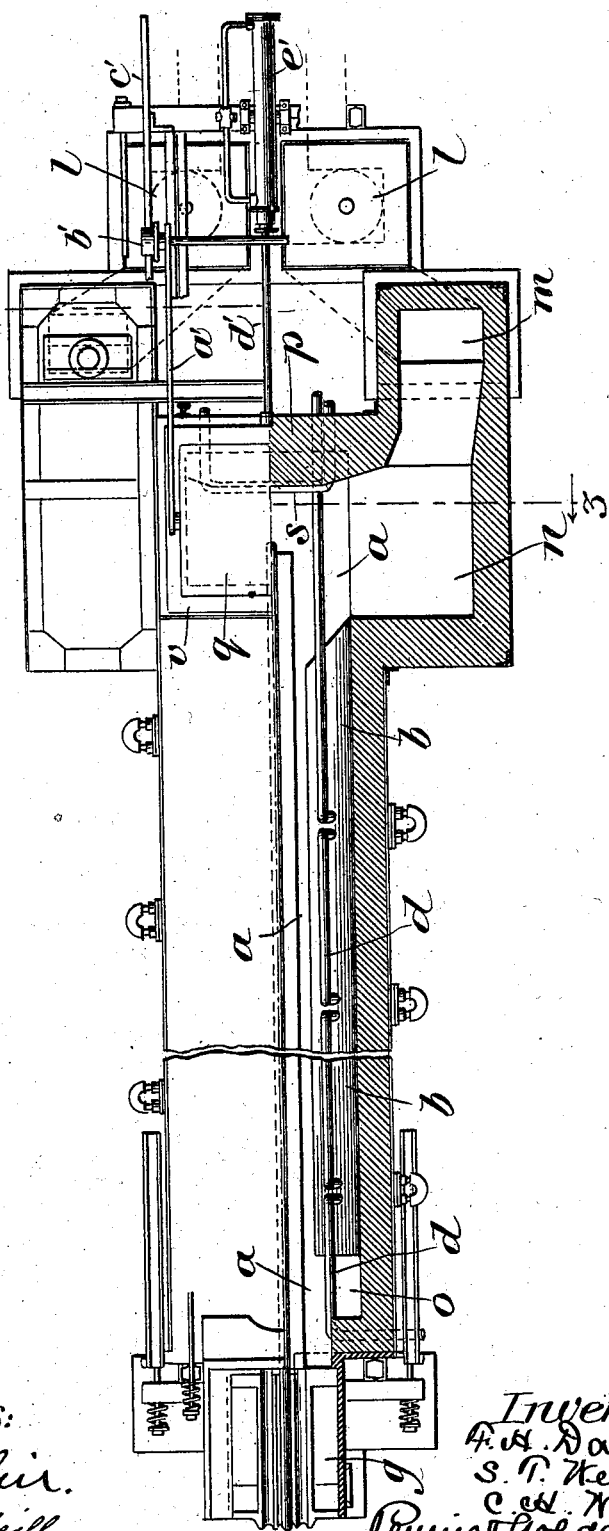
Figure 2:
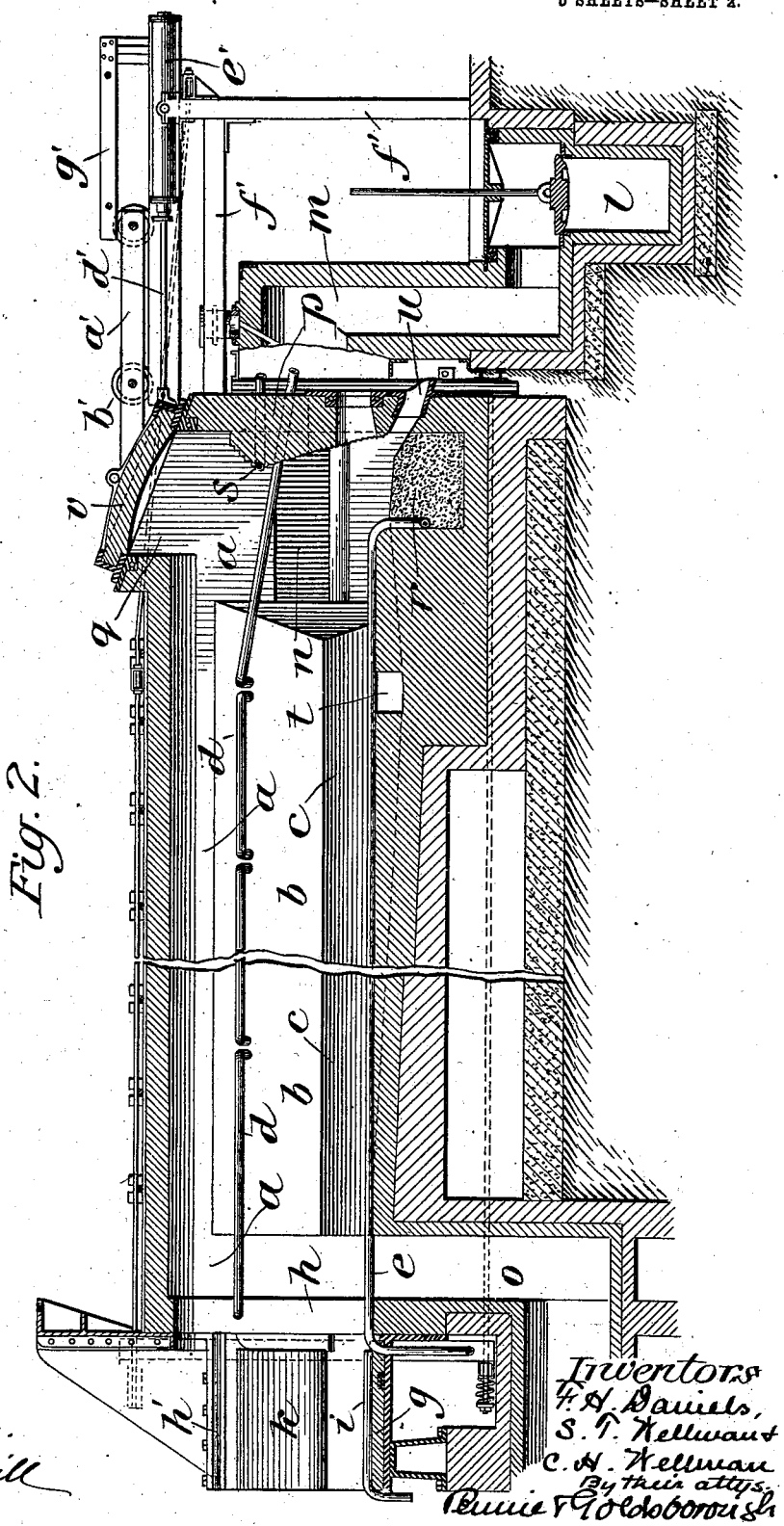
Figure 3:
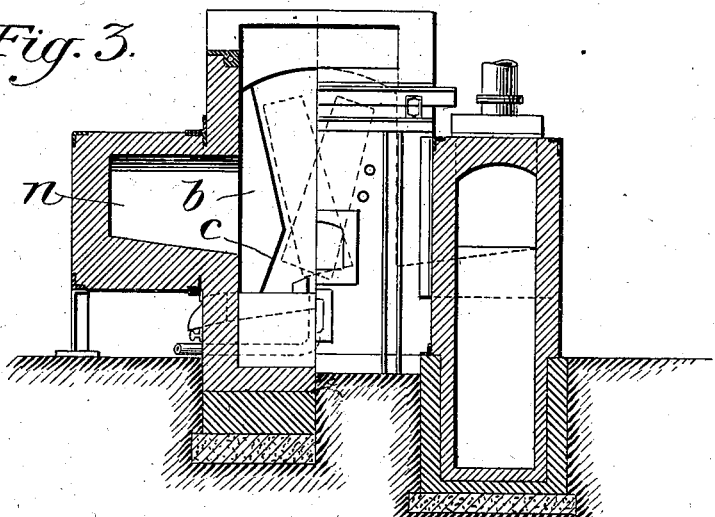
Figure 4:
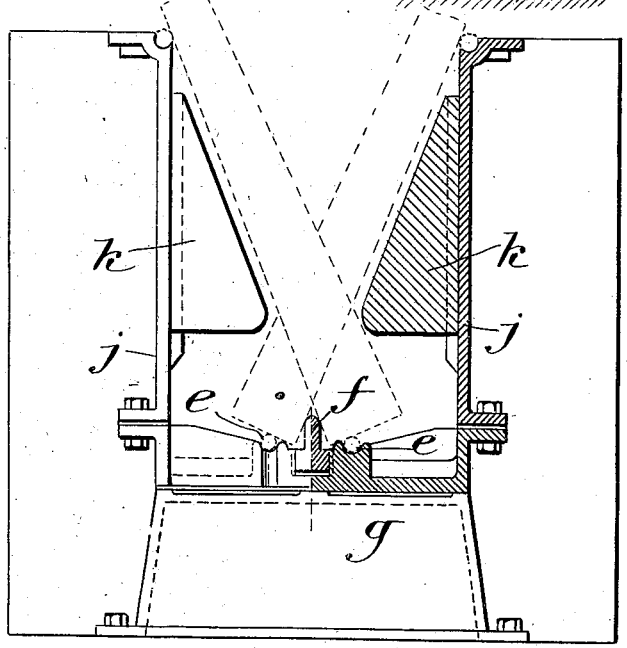

Figure 1 is a plan view of the entire furnace, one-half being shown in section. Fig. 2 is a central longitudinal section. Fig. 3 is a cross-section on the line 3 3, Fig. 1. Fig. 4 is a detail of the charging end of the furnace, partly in section, showing one arrangement for supporting the ingots. Fig. 5 is a similar view showing another arrangement for the same purpose. Fig. 6 is a central longitudinal section of the forehearth or shelf at the charging end of the furnace, and Figs. 7 and 8 are respectively a plan and sectional elevation of the discharge-door and means for operating it.

Referring to the views, $a$ denotes the heating-chamber of the furnace. It has the same general form and arrangement as that of our former patent, but is provided along its side walls with angular blocks $b$ of the form best shown in Figs. 2 and 3—that is to say, having their inner faces inclined from their upper ends toward the center of the furnace for something more than half their height and their lower portions inclined away from each other toward the furnace-walls, as shown at $c$ in Fig. 3, so that the furnace-chamber is formed with a narrow passage-way at a point a little below its center and has oppositely and outwardly flaring side walls above and below the narrow part. The object of this arrangement is to permit the ingots to be introduced into and pushed through the heating-chamber with alternate ingots leaning against opposite sides of the furnace-walls, as indicated in dotted lines in Figs. 3 and 4, and it is advisable that the distance apart of the widest portions of the blocks $b$ should not greatly exceed the width of the ingots. As in the construction of the former patent, the ingots are set up on end; but instead of all being arranged in upright position one behind another they are tipped alternately toward opposite sides and rest with their upper ends against water-cooled pipes $d$, which project through the furnace-walls and through the blocks $b$, as shown in Figs. 1 and 2. This arrangement greatly facilitates the heating of the ingots, inasmuch as it, in effect, divides the heating-chamber up into flues or passages for the products of combustion running zigzag from one end to the other and exposes all sides of the ingots to the direct action of flame and gases passing through the chamber. The lower ends of the ingots rest upon water-cooled pipes running along the floor of the furnace. The pipes $e$ may be arranged as shown in Fig. 1, where a single line runs down the middle of the heating-chamber, or as shown in Fig. 4, where two lines of pipe are shown, one on each side of a central rib $f$. These pipes sustain the main weight of the ingots and in combination with the side pipes $d$ support the ingots clear of the sides and floor of the heating-chamber.

At the charging end the furnace is provided just outside the door-opening with a shelf or forehearth $g$, upon which the ingots are deposited by a crane and from which they are pushed through the door-opening $h$ into the heating-chamber. The floor of this shelf or hearth is provided with a solid rod or rods $i$, which are arranged in line with the pipe or pipes $e$ of the furnace-chamber, so that the ingots readily slide from the rods onto the pipes. The shelf or forehearth is also provided with side pieces or wings $j$, and to these wings are secured angular blocks $k$, which are formed like the blocks $d$ on the inside of the furnace, except that they are cut away below the point where they come nearest together. These blocks $k$ perform the important function of positioning the ingots ready to be slid into the furnace. As before stated, the ingots are deposited upon the forehearth by cranes, and as they are lowered onto the shelf they strike one or the other of these blocks, and their lower ends are deflected, so that when released by the cranes they rest in the inclined positions indicated in dotted lines in Fig. 5, with their upper ends leaning against solid rods $h'$ $h'$, running along the side plates.

The furnace is fired by any sort of generators $l$ $l$, located at the end opposite the charging-door, and the products of combustion pass into the heating-chamber by way of the passages $m$ into lateral enlargements $n$ of the discharge end of the furnace. After passing through the furnace they issue through passages $o$ to the usual stack.

In the construction shown in our patent above referred to the discharge-door was in the end of the furnace and the ingots were discharged by being pushed out. In the present form we construct the discharge end of the furnace with a breast $p$ and form the discharge-opening $q$ in the roof, so that the ingots may be lifted up and out of the furnace by a crane. The floor of the furnace at this end is provided with a sand bed $r$, and the pipe or pipes $e$ are continued past the ends of the side blocks $d$ and are bent downwardly, so as to allow the ingots to slide off onto the bed in a position immediately under the discharge-opening. The sand bed being somewhat below the pipe $e$, we have provided the breast $p$ with a similar water-cooled pipe $s$ for the upper part of the end ingot to rest against when it falls forward, as it is likely to do when pushed from the pipes $e$ onto the bed $r$, and to prevent the ingot from falling over to one side we continue the end section of the side pipes $d$ past the discharge-opening and through the breast. The floor of the furnaces inclines from the level of the sand bed backward to a slag-discharge $t$, and the floor of the opposite end also inclines toward the same discharge, as indicated in dotted lines in Fig. 2. The slag from the sand bed $r$, which does not return to the discharge-port $t$, runs forward down an incline to a slag-spout $u$, whence it is delivered outside the furnace.

The discharge-opening $q$ is covered by a cover $v$, which is moved bodily sidewise, as will presently be described. The seat for the cover around the opening is inclined, as shown in Fig. 2, the lower edge being on that side whence the cover is moved to open it. The cover itself is pivotally mounted upon a carriage, which may be of any preferred construction, but is here shown as consisting of side bars $a'$ $a'$, traveling on rollers $b'$ $b'$, that run on rails $c'$ $c'$. The cover is pivoted about centrally of its width to the front ends of the side bars and is connected at its rear edge to the piston $d'$ of a pneumatic or hydraulic cylinder $e'$, that is mounted on trunnions, so as to accommodate itself to the tilting movements of the cover $v$. The side rails $c'$ $c'$ are supported by framing $f'$ $f'$, erected beyond the end of the furnace, and the cover when moved over the opening overhangs the rails. As the cover is quite heavy, it is therefore desirable to provide additional rails $g'$ $g'$ over the tops of the rear rollers to prevent the carriage from tipping up. The cover normally stands in about the position shown in Fig. 8 and is operated by the hydraulic cylinder to open and close the discharge-opening $q$, and the arrangement of the seat on an inclination to the plane of movement of the cover enables the opening and closing to be effected without lifting the weight of the cover. It also insures as tight a joint for the cover when closed as though it were of the vertically-lifting variety and has the additional advantage that the seat is kept free from the accumulation of slag, cinders, and dirt by the slight scraping movement of the edges of the cover on the inclined seat.

Such being the construction of our improved furnace, it is to be noted that it is adapted for any form of fuel that may be desired. The generators shown herein are only intended to illustrate the general arrangement and connection with the heating-chamber of whatever form of generator may be employed.

The ingots are delivered one at a time by the usual charging-crane and set up on end on the shelf or forehearth. As they are deposited they are tipped alternately to one side and the other and occupy on the hearth the same positions they preserve in their passage through the furnace. They are shoved into the furnace by any sort of a pusher that may be found convenient and effective, the charging-door (which usually slides vertically) being raised whenever it is desired to introduce more ingots. As the ingots move through the furnace in opposition to the passage of the products of combustion they are gradually and uniformly heated, and the time and temperature are so regulated that by the time the ingots reach the discharge end of the furnace they have been brought to the proper temperature. When the ingots reach the end of the pipe $e$, they slide off and rest on the sand bed $r$ with their upper ends leaning against the pipe $s$. In this position they may be easily lifted out through the opening in the roof.

Although we have shown the inclined blocks on the furnace-walls as coming nearest together at a point slightly below the horizontal center of the chamber, it is to be understood that the inclination of these blocks may be varied and that the narrowest part may be somewhat higher or lower than shown herein.

Having thus described our invention, what we claim is—

1. In an ingot-heating furnace, a shelf or forehearth at the charging end on a level with the furnace-floor, said shelf being provided with means for causing the ingots to assume inclined positions as they are deposited thereon.

2. In an ingot-heating furnace, a shelf or forehearth at the charging end on a level with the furnace-floor, said shelf having side rods for the ends of the ingots to lean against, and a rod or rods on the floor for the base of the ingot to rest on.

3. In an ingot-heating furnace, a shelf or forehearth at the charging end on a level with the furnace-floor, said shelf having side walls provided with blocks or plates inclining downward toward the center of the shelf so as to cause the ingots to lean to one side or the other.

4. In an ingot-heating furnace having side pipes for the upper ends of the ingots to lean against and a bottom pipe or pipes for the ingots to rest on, a shelf or forehearth at the charging end on a level with the furnace-floor, said shelf having an ingot-supporting rod forming a continuation of the bottom pipe in the floor of the furnace, and side rods for the upper ends of the ingots to lean against.

5. An ingot-heating furnace having a chamber formed to receive the ingots standing on end, the side walls of said chamber having blocks or plates inclining downward and inward so as to form a passage for the ingots which is wider above than at a point slightly below the horizontal center of the chamber.

6. An ingot-heating furnace having a chamber formed to receive the ingots standing on end, the side walls of said chamber having blocks or plates inclining from their upper ends downward and inward to a point somewhat below the horizontal center of the chamber whence said blocks are inclined downwardly and outwardly, whereby a passage for the ingots is formed which is narrow at the center of its height and wider in its upper and lower portions.

7. An ingot-heating furnace having a chamber formed to receive the ingots standing on end, said chamber having a longitudinal central rib on its floor and a water-cooled ingot-support consisting of a pipe on each side of the rib.

8. An ingot-heating furnace having a chamber formed to receive the ingots standing on end, a water-cooled support in the floor of the chamber for the ingots to slide on, a sand bed at the end of the support, and a breast or wall against which the ingot leans when it has been slid onto the bed from the support.

9. An ingot-heating furnace having a chamber formed to receive the ingots standing on end, a water-cooled support in the floor of the chamber on which the ingots slide, a sand bed at the end of the pipe, a breast or wall at the end of the chamber having a water-cooled support against which the ingot leans when it has been slid onto the bed from the floor-support, and water-cooled pipes at the sides of the chamber extending past the sand bed.

10. An ingot-heating furnace, having a continuous elongated chamber provided with a closed top and formed with a narrow passage adapted to receive the ingots standing on end and to permit them to be passed horizontally through the chamber in this position, said chamber having a breast or wall closing its discharge end horizontally, and an opening in the top at the discharge end through which the ingots may be lifted vertically.

11. An ingot-heating furnace, having a continuous elongated chamber formed with a narrow passage-way adapted to receive the ingots standing on end and permit them to be passed horizontally through said chamber in this position, a breast or wall closing the discharge end of the chamber horizontally, a sand bed in the end of the chamber adjacent to the breast, and an opening in the top of the chamber above the bed at the discharge end through which the ingots may be lifted vertically.

12. An ingot-heating furnace having a discharge-opening in its top with an inclined seat for a cover, a carriage movable in a horizontal plane and carrying a cover to open and close the opening, a cover pivoted centrally to the carriage, and means connected to one edge of the cover for moving it and the carriage.

13. An ingot-heating furnace having a discharge-opening in its top with a seat for a cover inclined to the horizontal, a carriage movable in a horizontal plane, a cover pivoted to the carriage, and means for moving the carriage.

In testimony whereof we affix our signatures in the presence of witnesses.

FRED H. DANIELS.
SAMUEL T. WELLMAN.
CHARLES H. WELLMAN.

Witnesses as to Fred H. Daniels:
   A. F. BACKLIN,
   JAMES W. SMITH.

Witnesses as to Samuel T. and Charles H. Wellman:
   C. W. COMSTOCK,
   C. H. ALTENHOF.